E. HARTER.
Horse Hay-Fork.
No. 98,258.
Patented Dec. 28, 1869.
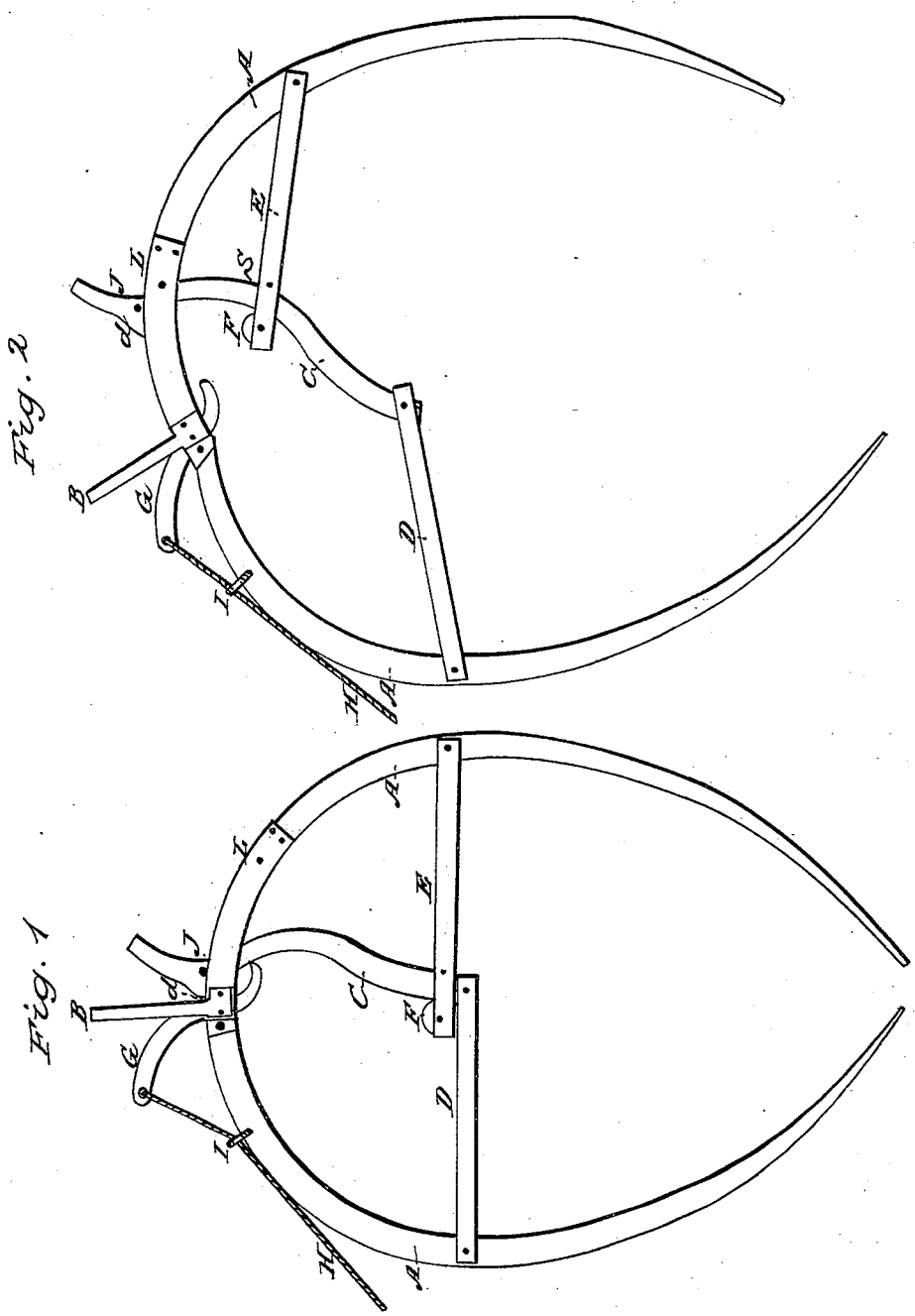
Witnesses:
Inventor:

United States Patent Office.

ELAM HARTER, OF DOWAGIAC, MICHIGAN.

Letters Patent No. 98,258, dated December 28, 1869.

HORSE HAY-FORK.

The Schedule referred to in these Letters Patent and making part of the same.

*To all whom it may concern:*

Be it known that I, ELAM HARTER, of Dowagiac, in the county of Cass, and State of Michigan, have invented a new and improved Tripping-Device for a Horse Hay-Fork; and I do hereby declare that the following is a full, clear, and exact description of the construction and operation of the same, reference being had to the annexed drawings, making a part of this specification, in which—

Figure 1 is a side elevation, with the fork closed, and

Figure 2 shows the position of the fork when open.

The nature of my invention consists in an improvement of the tripping-device for horse hay-forks of that class known as double or grappling-forks.

To enable others skilled in the art to make and use my invention, I will proceed to describe its construction and operation.

In the annexed drawings, making a part of this specification, A A represent the principal tines of my fork, which are in form like calipers, and may have any number of tines desired attached to the sides.

One of these tines is provided with a slot at the upper extremity, in which the opposite tine is pivoted, and in which the movable end of the coupling-lever C works.

The lower end of said lever is pivoted between the inner ends of the bars D, and the outer ends of of said bars are pivoted to opposite sides of one of the principal tines A A, and similar bars, E, are pivoted in like manner to the opposite tine.

Each set of bars D and E are pivoted to the tines at a point where said tines are the greatest distance apart.

The inner ends of bars E embrace the coupling-lever C, and are provided with the friction-roller F.

It will be seen that the inner ends of bars D and E overlap when the fork is closed, as shown in fig. 1, and the coupling-lever is thrown in a vertical position, when the hook *d*, on the upper end of said lever, engages with the pin, (not shown in the drawings.)

G represents a tripping-lever, pivoted near the joint in the principal tines, to the upper end of which the trip-cord H is attached.

The lower end of lever G impinges on the coupling-lever C when the trip-cord is pulled, disengaging the hook *d*, and allowing the tines to swing apart, as shown in fig. 2.

*i* represents a loop, through which the trip-cord passes.

*j* represents a pin through the upper end of coupling-lever C, to prevent said lever from dropping out of the slot.

L represents a pin, serving as a staff for the lever C, gauging the distance to open the fork, and may have several holes for changing the distance, as occasion may require.

B represents a loop, to which the hoisting-rope is attached.

To operate this fork, the tines are thrown apart and thrust into the hay. The curvature of the points of the tines draws them together while passing into the hay, causing the bars D and E to overlap, and the pin S crowds the coupling-lever to a vertical position, when said lever engages with a pin in top of the slot, as before described, holding the tines firmly together, until the fork, with its load, is elevated to its desired point, when a slight draw on the trip-cord disengages the coupling-lever, and drops the load.

Having thus fully described my invention,

What I claim as new, and desire to secure by Letters Patent, is—

1. The coupling-lever C, bars D and E, friction-roller F, and tripping-lever G, when constructed, arranged, and combined as set forth.

2. In combination with the above-claimed parts, the tines A A, hoisting-stem B, loop *i*, pins *j* and L, and hook *d*, substantially as set forth.

ELAM HARTER.

Witnesses:
B. W. SCHERMERHORN,
S. H. WHEELER.